(12) United States Patent
van Geel et al.

(10) Patent No.: US 11,445,105 B2
(45) Date of Patent: Sep. 13, 2022

(54) CONTROL SYSTEM AND METHOD FOR SINGLE-HANDED SEAMLESS CAMERA CONTROL

(71) Applicant: Grass Valley Canada, Montreal (CA)

(72) Inventors: Martinus Wilhelmus Cornelis van Geel, Breda (NL); Bart Gerardus Antonius van Dijk, Breda (NL); Niels Hiemstra, Breda (NL)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 16/834,227

(22) Filed: Mar. 30, 2020

(65) Prior Publication Data

US 2020/0314327 A1    Oct. 1, 2020

Related U.S. Application Data

(60) Provisional application No. 62/827,654, filed on Apr. 1, 2019.

(51) Int. Cl.
*H04N 5/232* (2006.01)
*H04N 5/225* (2006.01)

(52) U.S. Cl.
CPC ....... *H04N 5/23216* (2013.01); *H04N 5/2252* (2013.01); *H04N 5/23203* (2013.01)

(58) Field of Classification Search
CPC ............. H04N 5/23216; H04N 5/2252; H04N 5/23203
See application file for complete search history.

(56) References Cited

U.S. PATENT DOCUMENTS

| 5,396,287 A | 3/1995 | Cho |
| 5,566,087 A | 10/1996 | Voigt et al. |
| 2010/0045817 A1 | 2/2010 | Saijo |
| 2010/0066831 A1 | 3/2010 | Origuchi |

(Continued)

FOREIGN PATENT DOCUMENTS

| JP | 2005203874 A | 7/2005 |
| JP | 2006279642 A | 10/2006 |
| WO | 2019051523 A1 | 3/2019 |

OTHER PUBLICATIONS

Remote Control Panel Sony RCP-3100—Operating Instructions, (2018), http://pro.sony/support/res/manuals/5001/344d556a3e0a24c23a4ef71e7028d388/50017471M.pdf (Year: 2018).*

(Continued)

*Primary Examiner* — Hesham K Abouzahra
(74) *Attorney, Agent, or Firm* — ArentFox Schiff LLP

(57) ABSTRACT

An image capture control apparatus is provided for single-handed seamless camera control of a camera during capture of video content. The apparatus includes a stick extending from a base and operating bi-directionally to adjust a setting of the camera. Moreover, first, second and third continuous control elements are disposed around the base to control respective parameters of the camera for image content capture. Each of the first continuous control element, the second continuous control element and the third continuous control element are configured to be physically manipulated simultaneously by a hand of an operator of the single-handed seamless camera.

20 Claims, 5 Drawing Sheets

(56) References Cited

U.S. PATENT DOCUMENTS

2015/0341542 A1    11/2015   Preston
2018/0124304 A1*   5/2018   Niemeyer .......... H04N 5/23293
2018/0302570 A1    10/2018   Guo et al.

OTHER PUBLICATIONS

International Search Report and Written Opinion received in PCT/EP2020/059175, dated Jul. 14, 2020.
"WCU-4 Wireless Compact Unit User Manual", ARRI, Dec. 12, 2018, http://www.arri.com/resource/blob/42880/6193aefe25dc3062fd61221c5c0faf35/wcu-4manual-data.pdf.
"Remote Control Panel Sony RCP-3100—Operating Instructions", (2018), http://pro.sony/support/res/manuals/5001/344d556a3e0a24c23a4ef71e7028d388/50017471M.pdf.

* cited by examiner

CONTROL SYSTEM AND METHOD FOR SINGLE-HANDED SEAMLESS CAMERA CONTROL

CROSS REFERENCE TO RELATED APPLICATIONS

The present application claims priority to U.S. Patent Provisional Application No. 62/827,654, filed Apr. 1, 2019, the contents of which are hereby incorporated in their entirety.

TECHNICAL FIELD

The present disclosure generally relates to an apparatus for controlling camera operations, and more particularly to a control system and method for single-handed seamless camera control.

BACKGROUND

In broadcast, it is common use to have a single control panel per camera that controls all functions available in a camera and its connected elements, such as a camera lens. In the industry, the person operating such a panel is referred to as a "shader" and his or her primary responsibility is to modify the parameters of a camera in such a way that the image is pleasant to watch and/or matches a reference camera.

A typical control panel consists of a varying number of buttons, a display and a so-called stick. The stick is a control element, typically located at the lower end of the panel, sticking out perpendicularly to the control panel's surface. It can pivot up and down, controlling a function. In addition, there's a second control in the stick, which is a ring rotating around the stick, controlling a second function.

With conventional designs, existing camera control panels feature a stick with only two operational controls: generally the lens' iris control and master-black control. However, when making a transition, for example from indoor to outdoor scenes, more than two controls need to be operated simultaneously in order to present a pleasing scene for a viewer. Normally this is performed using two hands: one hand controls the stick while the other hand controls another control element on the panel. As a result, conventional configurations limit the amount of cameras that can be shaded simultaneously to one, while often multiple cameras require shading at the same time. Further, this is an ergonomically disadvantaged way of operating, resulting in transitions that are not as smooth as they could be.

SUMMARY

A control system for single-handed seamless camera control is provided in the present disclosure. In exemplary aspects, the control system includes a plurality of cameras configured to capture video content, a plurality of panels each configured to control a single camera of the plurality of cameras, a panel comprising: at least one apparatus for single-handed seamless camera control, the at least one apparatus comprising: a base, coupled to the panel, configured to secure the at least one apparatus, a stick extending from the base and configured to operate bi-directionally, a first continuous control element disposed around the base of the at least one apparatus configured to control a first parameter of a camera, a second continuous control element disposed at a distal end of the at least one apparatus configured to control a second parameter of the camera, a third continuous control element disposed at a distal end of the at least one apparatus configured to control a third parameter of the camera, and at least one dividing element between the second continuous control element and the second continuous control element configured to allow the second and third continuous control element to be controlled independently.

In another exemplary aspect, a single-handed seamless camera controller is provided that includes a base, coupled to the panel, configured to secure the at least one apparatus; a stick extending from the base and configured to operate bi-directionally; a first continuous control element disposed around the base of the at least one apparatus configured to control a first parameter of a camera; a second continuous control element disposed at a distal end of the at least one apparatus configured to control a second parameter of the camera; a third continuous control element disposed at a distal end of the at least one apparatus configured to control a third parameter of the camera, and at least one dividing element between the second continuous control element and the second continuous control element configured to allow the second and third continuous control element to be controlled independently.

In a refinement of this aspect, each of the first continuous control element, the second continuous control element and the third continuous control element are configured to be controlled simultaneously by a hand of a shader operating the control system. Moreover, a processor is provided that is configured to detect adjustment of a continuous control on the at least one apparatus; retrieve a video function that is mapped to the adjusted continuous control; map a current value of the adjusted continuous control to a respective value in a range of values of the video function; and apply the mapped value to the video function of one of the plurality of cameras.

In some aspects, each of the first continuous control element, the second continuous control element and the third continuous control element are configured to be controlled simultaneously by a hand of a shader operating the control system.

The control system further comprises a processor, configured to detect adjustment of a continuous control on the at least one apparatus, retrieve a video function that is mapped to the adjusted continuous control, map a current value of the adjusted continuous control to a respective value in a range of values of the video function, and apply the mapped value to the video function of one of the plurality of cameras.

DETAILED DESCRIPTION

Figure 1:
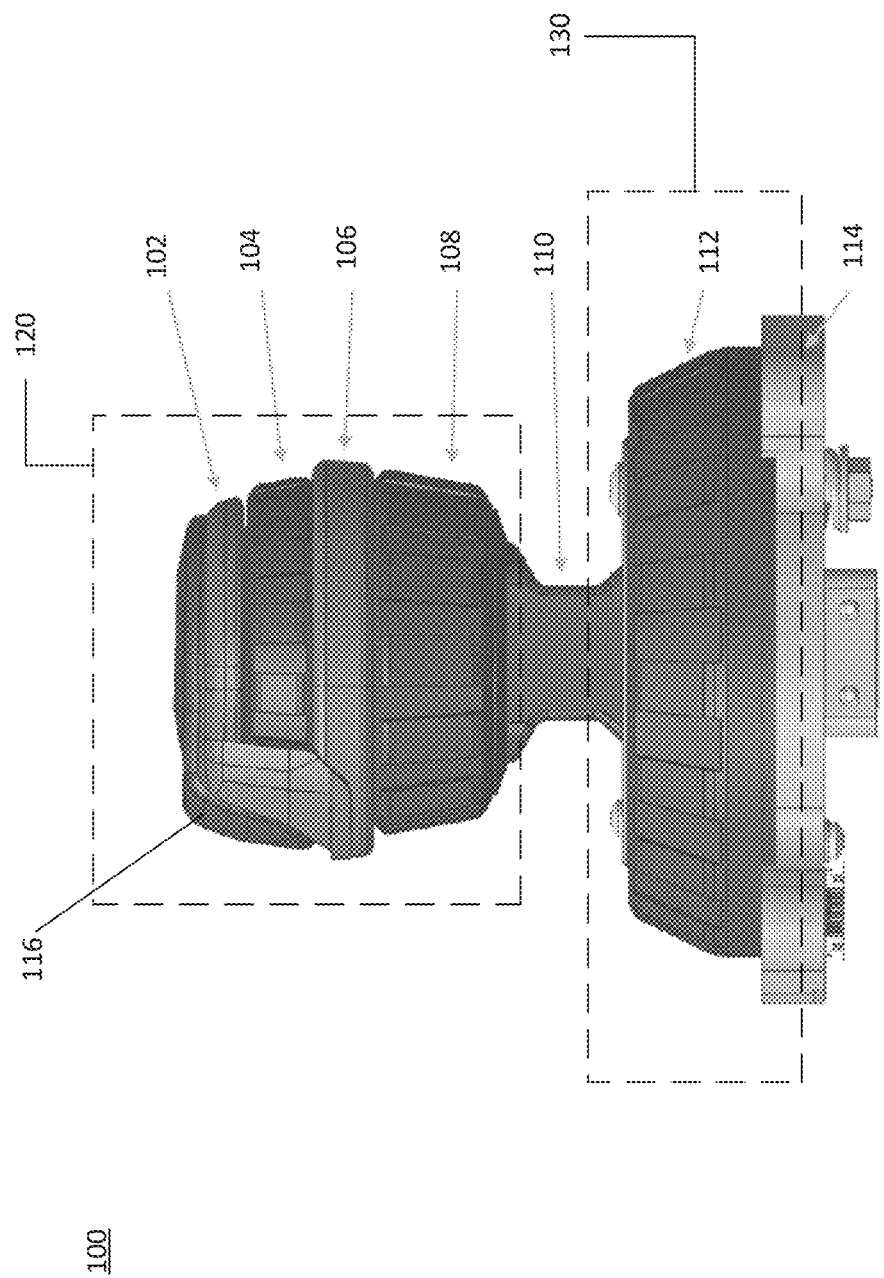
FIG. 1 illustrates an apparatus for single-handed seamless camera control, in accordance with an exemplary embodiment.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

When a camera moves from capturing an indoor scene to capturing an outdoor scene (as an example transition that may occur in filming and image capture), a number of properties typically change, including, for example, the intensity of the scene, and the color temperature of the scene and the contrast in the scene, although those of ordinary skill in the art will recognize that many other ambient properties may change. The elements that are needed to manage the changes for purposes of clear and pleasant video capture (from the viewer's perspective) include the lens' iris and the color-balance. In some exemplary aspects, the apparatus described herein is configured to allow the shader simultaneous controls of the lens' iris, master gain, color-balance and master-black (black levels). With the apparatus provided, all controls may be assigned to elements on the stick so that smooth scene transitions can be realized with a single hand, while the camera can remain on-air. In addition, the shader may be transitioning a second camera similarly using his or her other hand, if needed.

The example described above is only one example of operation; many different scenarios can benefit from the streamlined control of the apparatus. Every production may require other critical elements that need to be controlled simultaneously and smoothly. Therefore, the functions assigned to the control elements can be chosen freely and modified freely. Going forward, the variety of functions that need simultaneous control is only growing, further increasing the possibilities of usage of the apparatus. New video-modes, such as High Dynamic Range (HDR) video, may require different and new functions than used in conventional and existing camera control. The apparatus overcomes the disadvantages and limits of typical control panels, and helps prevent control panels from becoming even less user-friendly than they are today with such existing cumbersome configurations. When control panels were initially contemplated, most camera control functions were not continuous functions with a resolution well within visible steps, but were coarse steps. As a result, the need for smooth controls and the functions themselves did not exist, or they were not typically available when a scene was visible to the viewers ('on-air').

FIG. 1 illustrates an apparatus 100 for single-handed seamless camera control, in accordance with an exemplary embodiment. In an exemplary aspect, the apparatus 100 (i.e., a single-handed seamless camera controller) has various control components that are configured to aid a shader in modifying scene and camera parameters, making scene transitions smooth and seamless and avoiding jarring visual changes for the viewers. In this embodiment, the apparatus 100 comprises a stick 110 extending from a base mounted on a panel 114, a first ring 112 disposed at the base region 140 of the stick 110, a second ring 108 disposed around a bottom portion in the control region 120 of the apparatus 100 and a third ring 104 disposed around a top portion in the control region 120 of the apparatus 100. The apparatus 100 further comprises a dividing element 102 (i.e., a first control region divider), a dividing element 106 (i.e., a second control region divider) and a button control 116.

According to one embodiment, the stick 110 is configured to move forward and backwards, or laterally side to side, though other two-way directional configurations are also contemplated. In essence, the stick 110 is generally assigned to a function that does not need fine or continuous adjustment.

According to this embodiment, the first ring 112, the second ring 108 and the third ring 104 of the apparatus 100 are implemented as rotary controls that are continuously rotatable. The continuous rings are designed so that the first ring (i.e., the lower ring) 112 can be easily controlled while a shader's hand rests around the stick 110 for precision modifications. The second ring 108 and the third ring 104 at the top of the apparatus 100 are implemented such that they are easily controlled by the shader's fingers. In exemplary aspects, the second ring 108 and the third ring 104 are separated from each other according to a pre-calibrated distance ensuring they can be distinctly and independently controlled. Further, the length of the stick 110 may be adjustable to conform to the size of a shader's hands. As described above, the ring controls are "continuous" controls, as opposed to toggle switches, in order to provide smooth operation as required by the shader. In some embodiments, there may be more than three rings for different controllable aspects. In some aspects, the apparatus 100 may provide physical or digital/mechanical audio feedback as each ring control is rotated. In some aspects, each ring may provide different feedback so a shader need not look directly at the control, but can aurally determine which control is being adjusted.

Further, the present disclosure also contemplates that instead of rings, pressure sensitive control elements may be used to change each mapped setting. The pressure sensitive control elements may change the value of particular parameters, such as master gain, master black or the like as a user pushes harder or releases pressure on the control element. In some embodiments, the control elements may be touch sensitive "digital" rotary control elements that modify the values of mapped functions based on movement detected on the touch sensitive digital rotary control element. In other embodiments or aspects, any form of pressure sensitivity or movement could be used as control elements, where the elements can be activated without needing to look at the control. In exemplary aspects, sensory feedback is provided that can be felt by the shader.

In some aspects, the adjustments to each control element correspond to seamless changes in the mapped function. For example, the gain changes in steps of 0.1 Db and movement of a ring to control the gain would produce a seamless change for the viewer. However, the resolution (e.g., step value), sensitivity and the positioning of each ring may be adjusted according to user desire, either through a user interface or other configuration method.

In a specific configuration example, the stick 110 can be configured to be mapped to control a camera's lens' iris (e.g., a lens iris controller), while the first ring 112 controls master gain (e.g., a master gain controller), the second ring 108 controls color-balance (e.g., a color-balance controller) and the third ring 104 controls master-black values of the camera (e.g., a master-black value controller). Thus, if the shader wants to adjust the master gain, the shader rotates the first ring 112 with his or her fingers to increase or decrease the mast gain based on the direction of rotation (e.g., clockwise versus counterclockwise). Upon rotation, the adjustment of the ring control 112 transmits a signal (i.e., a master gain control signal) to a camera under the shader's control to increase or decrease the master gain, depending on the direction of rotation of the first ring 112. According to a predefined user configuration, as the value of the master gain reaches a minimum (i.e., a minimum gain control threshold) within the defined range, the master gain may no longer be reduced despite continuous rotation of the first ring 112. Similarly, as the value of the master gain reaches a maximum (i.e., a maximum gain control threshold) within the defined range, the master gain may no longer be increased despite continuous rotation of the first ring 112.

However, it is possible that a user may desire that a control value loop back around from minimum to maximum (or from the maximum value to the minimum value) as the control is rotated one or the other direction continuously and the apparatus 100 can be configured accordingly. In one embodiment, a user may desire that the continuous control of the first ring 112 be linearly mapped to the master gain control where turning the control a specified degree only changes the master gain control by a specified value. In another embodiment, the rotation may be non-linearly mapped to the master gain control. For example, as a shader rotates the first ring 112, the master gain increases logarithmically, exponentially, or in any other predefined proportion, of which such control can be configured according to user control or predefined settings, for example. Similarly, each of the continuous controls may be configured as described above regarding loop back, continuous rotation, linear and non-linear value mappings and the like.

In addition to the physical layout of apparatus 100, the implementation is such that the function controlled by all control elements can be assigned by a user in order to support the described operations, as well as any other set of functions such as HDR settings (e.g., gamma breaking point, where the gamma curve of the two parts can be set independently to create an artistic look within the large exposure range), or even new functions that are yet to be developed. Thus, according to an exemplary aspect, the apparatus 100 is fully programmable according to a user's need and any of the controls can be mapped to any of the functions provided by a camera under control. An exemplary embodiment for configuring the apparatus 100 will be described in more detail below.

In an exemplary aspect as further shown in FIG. 1, element 102 and element 106 are configured as mechanical dividers to ensure that controls 104 and 106 can be rotated independently and will not be inadvertently adjusted by a user during operation. Moreover, the button control 116 is enabled when it is pressed down and can be configured, for example, to enable a display controlled by the shader to switch to a particular camera for transitioning. In some aspects, the apparatus 100 can be configured to set a reference value for a particular parameter. For example, if the shader has adjusted the first ring 112 to a point where the master gain is ideal for a particular scene, and later the shader needs to change the master gain, the shader may store the current master gain value and subsequently recall the stored master gain when returning to the particular scene instead of adjusting the first ring 112 to attempt to redundantly find the ideal settings, using additional control elements on the apparatus 100. In some embodiments, the apparatus 100 transmits a transitioning signal to the camera so the camera transitions from the current master gain to the stored master gain using an additional control element on the apparatus 100. Similarly, the controls for storing and retrieving master gain values may also or alternatively be used to store other camera and scene settings for easy retrieval and application. In other embodiments, artificial intelligence may be used to monitor changes that a shader makes based on historical transitions performed by the shader, given particular parameters. So when a scene transition with similar parameter transitions are encountered, a controller associated with the apparatus can be configured to learn and predict the functions' settings and apply them automatically, or assist the shader in providing suggested values or the like. In one exemplary aspect, a shader can configure how much predictive adjustments are made and balanced with how much manual control the shader has.

As an example, an image capture setting controller coupled to the apparatus is configured to preset reference values for the respective parameters controlled by the first, second and third continuous control elements. During operation, the image capture setting controller can determine characteristics of the video content (e.g., the scene) captured by the camera, such as lighting, shadows, color, movement and the like. Using one or more of these detected values, the image capture setting controller can then identify the preset reference values for the respective parameter based on the determined characteristics to assist the shader in suggested values. In one aspect, the image capture setting controller automatically changes the settings of the apparatus 100 based on the detected characteristics of the captured video content to optimize further video capture.

Currently, when cameras goes outdoors, shaders must change the amount of light, as well as color temperature which takes a significant amount of time. The image will look bluish, normal, overexposed or underexposed for example, for a period of time and a viewer will likely notice the irregularity. Apparatus 100 however greatly reduces this time because a shader can control critical parameters for this transition with one hand. Thus, gain and color temperature can be adjusted simultaneously at the same time that there is a scene transition.

It should be appreciated that an exemplary design for apparatus 100 is shown in FIG. 1. Alternative configurations may have different ergonomic considerations or control placements, but the inclusion of at least two continuous controls will be preferable.

Figure 2:
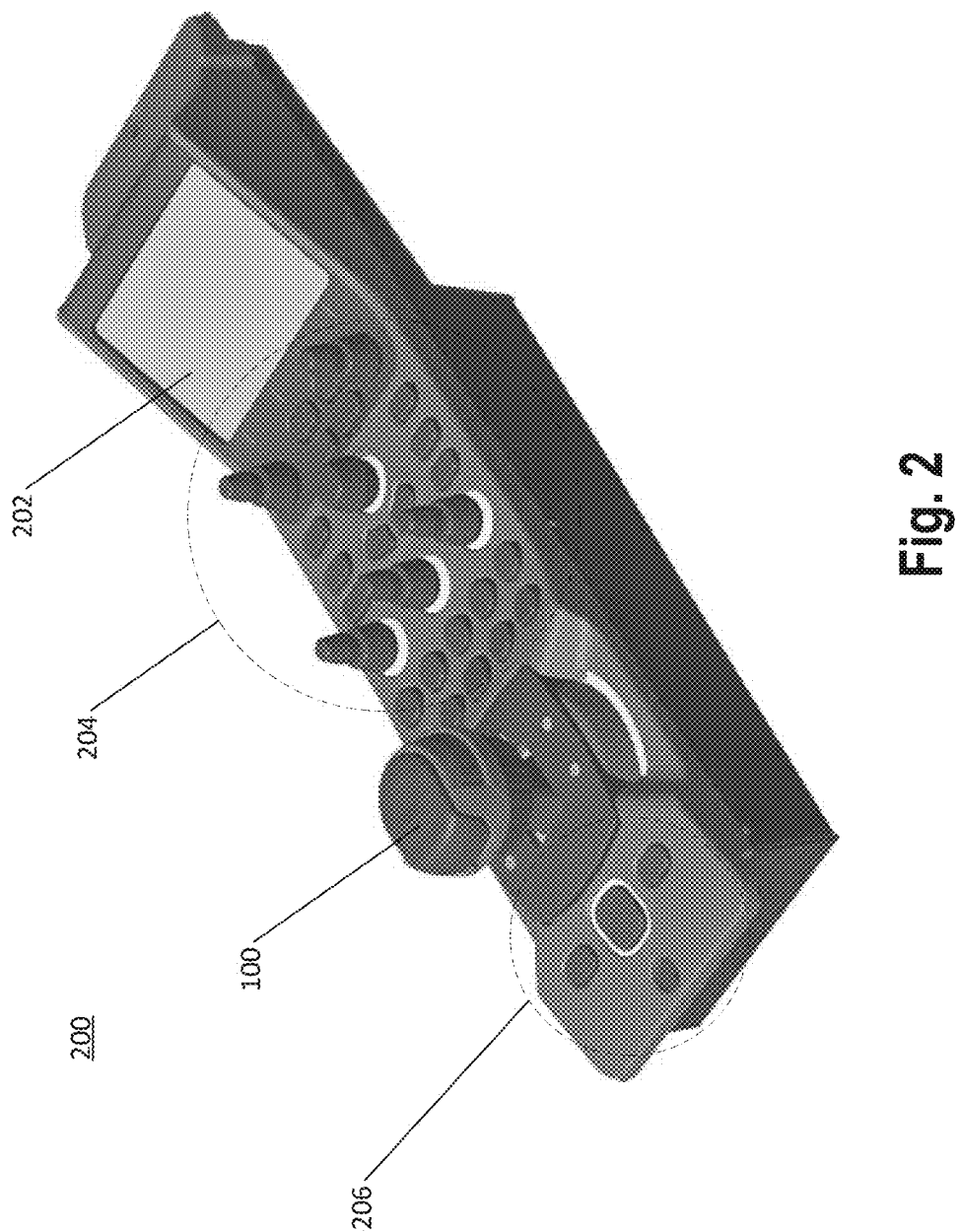
FIG. 2 illustrates a panel incorporating the apparatus for single-handed seamless camera control, in accordance with an exemplary embodiment.

FIG. 2 illustrates a panel 200 incorporating the apparatus 100 for single-handed seamless camera control, in accordance with an exemplary embodiment.

Figure 3:
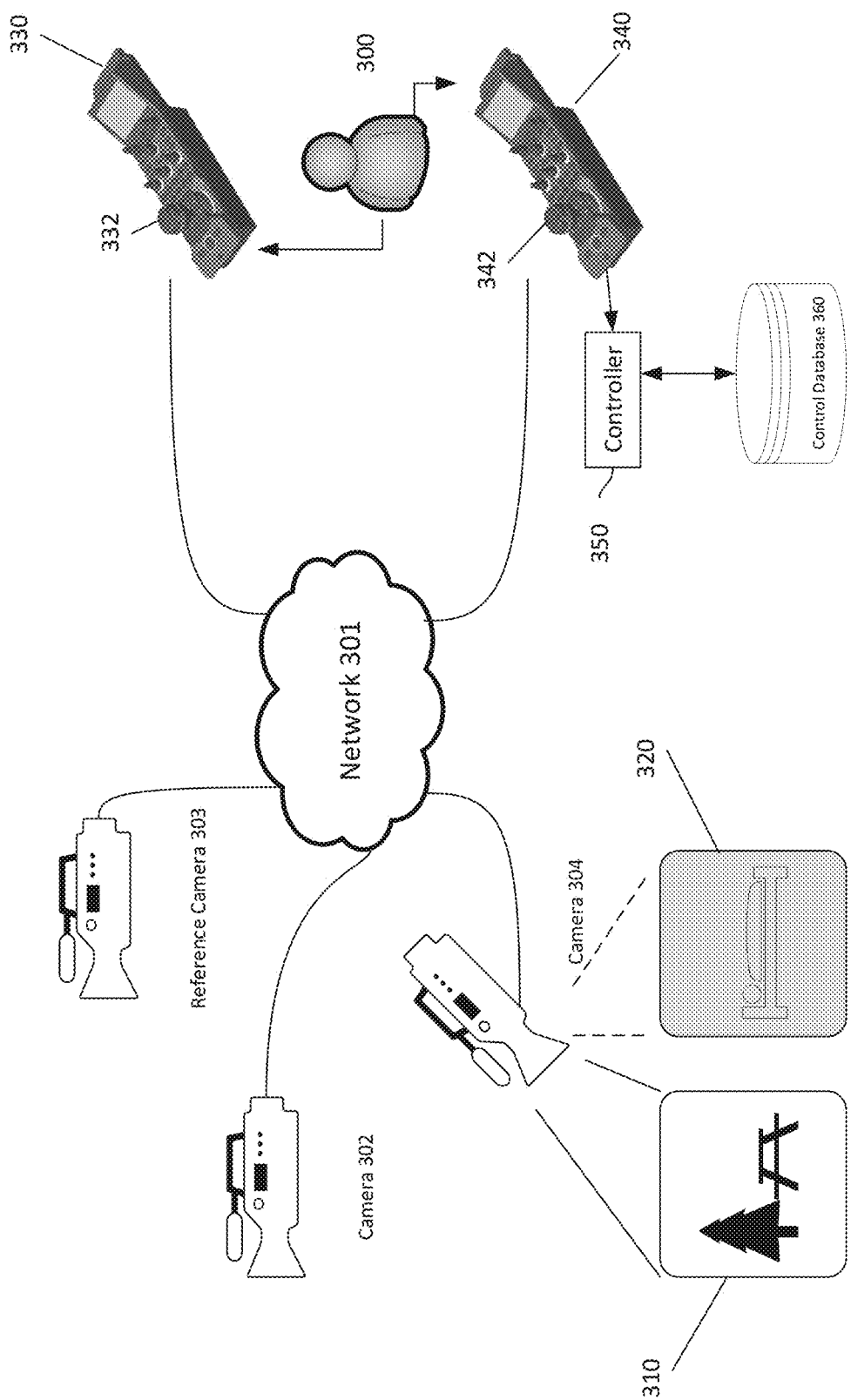
FIG. 3 illustrates exemplary operation of multiple panels in controlling multiple cameras, in accordance with an exemplary embodiment.

Specifically, in an exemplary aspect, each shader controls a plurality of panels similar to panel 200, where each panel 200 controls a camera as shown in FIG. 3. Each panel 200 incorporates the apparatus 100 as a control element among a plurality of other control elements 204 and 206. The panel 200 can also include a display panel 202 that is configured to display, in one aspect, one or more settings being currently adjusted, the value of the settings as they are adjusted, other settings that may be affected, in addition to default values that are selected to be continuously displayed as the shader adjusts the various control elements. According to one aspect, the panel 200 may also come equipped with multiple apparatuses 100, each apparatus 10 controlling a single camera, or controlling different functions of the same camera.

FIG. 3 illustrates a control system for exemplary operation of multiple panels in controlling multiple cameras, in accordance with an exemplary embodiment.

In an exemplary embodiment, a shader 300 may be operating a panel 330 with apparatus 332 in order to control camera 302 and a panel 340 with apparatus 342 in order to control camera 304. In some aspects, the panels 330 and 340 are directly coupled to the respective cameras 302 and 304 wired or wirelessly, respectively, but in other aspects the panels 200 may control the respective cameras 302 and 304 wirelessly, or wired, via a network 301.

In one example, the camera 304 can be configured to transition from capturing an outdoor scene 310 to an indoor scene 320, where the values of the camera parameters drastically differ to achieve similar picture quality. As the camera transitions from scene 310 to scene 320, the shader 300 operates panel 340 and adjusts, for example, iris lens, master gain, and the like using apparatus 342, which corresponds to apparatus 100 as described above with respect to FIG. 1, for example. Simultaneously, however, the camera 302 can also be configured to automatically transition, for example from a first scene (e.g., an indoor scene) to a second scene (e.g., an outdoor scene). Since the shader only needs a single hand to control multiple parameters of a single camera, the shader can control the parameters of camera 302 by manipulating the apparatus 332 of panel 330, simultaneously while he or she adjusts the parameters of camera 304 by manipulating the apparatus 342 of panel 340. Further, the shader 300 may adjust the parameters according to a reference camera 303. In some embodiments, the shader generally control more than two cameras, and may control up to eight to eleven cameras. However, with the present configuration, shaders may control two cameras at once instead of previously known configurations where only one camera could be controlled at one time.

In exemplary aspects, the apparatus 332 and 342 each have an associated controller (e.g., an image capture setting controller) that maps values from the controls to video and camera controls. For example, apparatus 332 has a controller 350 that determines which control was actuated. In one aspect, the controller 350 can be integrated as a component of apparatus 342. In another aspect, controller 350 can be a separate component wired or wireless coupled (e.g., by Bluetooth connection) to apparatus 342. In either case, controller 350 can be a computer processing device configured to execute software for performing the algorithms and functionality described herein. For example, the controller (e.g., an image capture setting controller) can be configured to automatically access preset content capture settings for the one or more cameras and adjust the control elements (and/or provide recommendations for the operator) based on the detected characteristics of the content currently being captured by the one or more cameras.

In an exemplary aspect, once the controller 350 knows which control was activated, the controller 350 can be configured to query (i.e., by sending a video parameter request) a controls database 360 to determine which video parameter that the activated control is associated with. In some aspects, the controls database 360 may also include range mappings, methods of mapping the controls, and the like as described with respect to FIG. 1. The controller 350 is configured to dynamically retrieve the associated video parameter (alternatively referred to as function), and the method of mapping from the control to the range of the video parameter. The controller 350 maps the control value to the video parameter value, and then dynamically transmits the mapped value to the camera 304, or whichever camera is coupled to a particular panel. Similarly, in this aspect all panels and apparatus map their controls using a similar controller. In some exemplary embodiments, each panel contains a controller for the apparatus 100 as described above. In some embodiments, each panel may store some or all of the information contained in the controls database 360 to avoid latency over the network when performing camera controls, in order to ensure seamless scene transitions.

Moreover, in one aspect, the controller 350 can be configured to record pre-set settings, as selected by the operator of apparatus 340, for a particular scene with particular image capture settings for one or more over cameras 302-304. In an further example, apparatus 340 and/or controller 350 can provide a user interface that enables the operator to define the pre-set settings by name so that the operator can subsequently and dynamically recall these settings (e.g., by sending a video parameter request) to control database 360.

In some exemplary aspects, a panel (e.g., panel 330) may be coupled to an HDR camera 302, but then the panel is configured to couple to an SDR camera, or vice versa. The panel 330 and the apparatus 332 each have adaptable configurations where a controller recognizes the change and remaps the control values of each control element on the panel 332 and the apparatus 332 according to the change.

Figure 4:
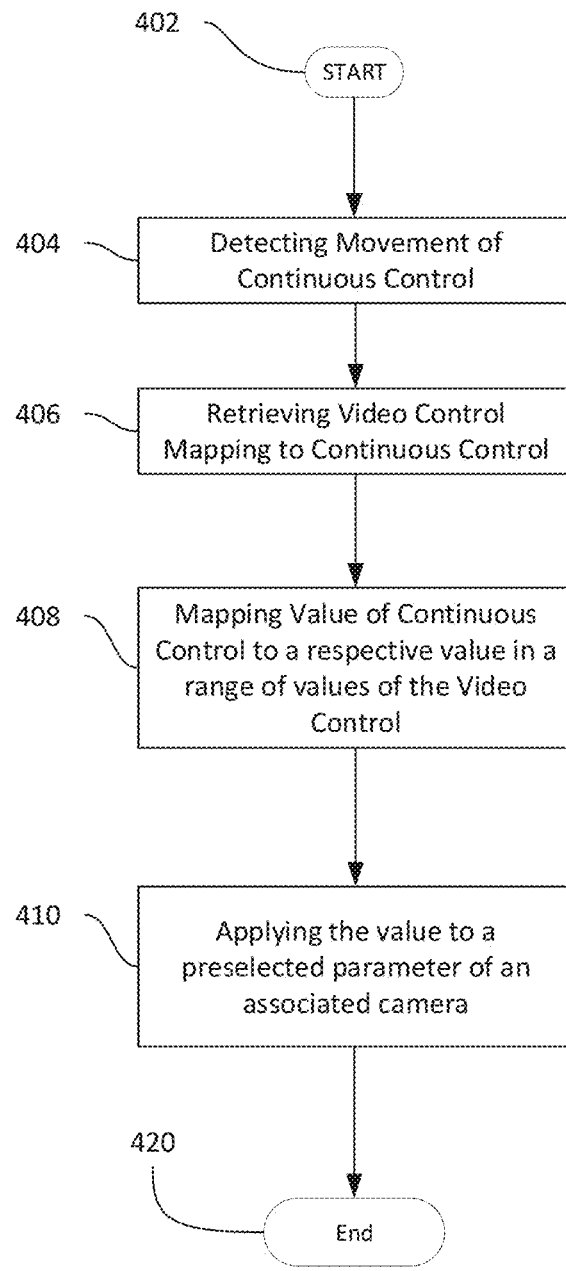
FIG. 4 is a flow diagram of a method for single-handed seamless camera control, in accordance with an exemplary embodiment.

FIG. 4 is a flow diagram of a method 400 for single-handed seamless camera control, in accordance with exemplary aspects of the present disclosure.

The method 400 begins at step 402 when a shader initiates operation of the apparatus 100, for example, and proceeds to step 404.

At step 404, a controller of the apparatus 100 detects movement of a continuous control on the apparatus 100. For example, the controller may detect movement in one of the ring controls (e.g., first ring control element 112, second ring control element 108 and third ring control element 104), or any actuator on the apparatus 100. In some aspects, the controller also detects control actuation for any control element on an associated panel (e.g., panel 200).

At step 406, the controller retrieves a video control that is mapped to the adjusted continuous control. Because each of the control elements is configurable to change any number of settings or functions, the controller may need to reference the most current mapping for each control element from a database, a local record in local memory or the like.

At step 408, the controller maps the value of the continuous control to a respective value in a range of values of the video control. Each control element (e.g., the rotary ring elements) have an associated "step" change (e.g., 1 dB for gain or the like), thus the controller must assess the measured adjustment of the control element, retrieve step information, and then use this information to map the adjustment into a permissible range of the particular control.

Finally at 410, the controller applies the mapped value to a preselected parameter of an associated camera associated with the video control. In other words, whatever function is assigned to the particular control element that has been adjusted, the controller takes the mapped value and adjusts the function according to the mapped value. This may occur over a network or may be directly controlled or the like. The method terminates at 420. Moreover, it should be appreciated that steps 404 to 410 can be repeated as part of a feedback loop as the shader is using the apparatus 100 during video content capture.

Figure 5:
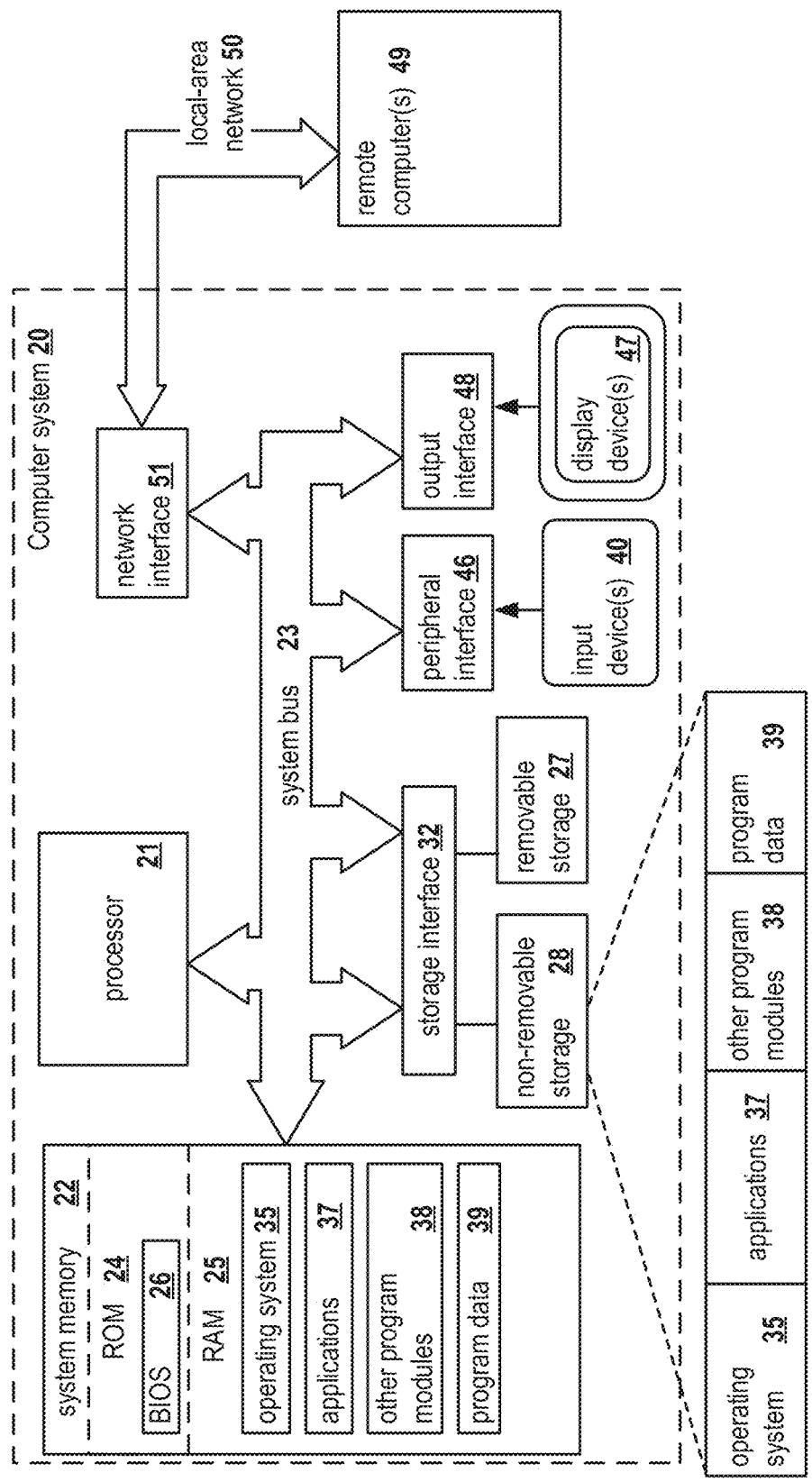
FIG. 5 is a block diagram illustrating a computer system on which aspects of systems and methods for single-handed seamless camera control can be implemented in accordance with an exemplary aspect.

FIG. 5 is a block diagram illustrating a computer system 20 on which aspects of a control system and methods for single-handed seamless camera control may be implemented in accordance with an exemplary aspect. It should be noted that the computer system 20 can correspond to the controller of the apparatus 100, for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. An image capture control system for single-handed seamless camera control, the image capture control system comprising:
   a camera configured to capture video content;
   a panel configured to control image capture settings of the camera and comprising:
      a single-handed seamless camera controller including:
         a base that is coupled to the panel and configured to secure the respective single-handed seamless camera controller;
         a stick extending from the base and configured to operate bi-directionally to adjust a lens iris of the camera;
         a first continuous rotatable control element disposed around the base of the single-handed seamless camera controller that is configured to rotate about an axis of the stick to control a first parameter of the camera, wherein the first parameter is a master gain of the image capture settings of the camera;
         a second continuous control element disposed on the stick of the single-handed seamless camera and configured to control a second parameter of the camera, wherein the second parameter is a color-balance of the image capture settings of the camera;
         a third continuous control element disposed at a distal end of the stick with the second continuous control element disposed between the first and third continuous control elements, and wherein the third continuous control element is configured to control a third parameter of the camera that is a master-black value of the image capture settings of the camera, and
         a dividing element disposed between the second and third continuous control elements and configured to allow the second and third continuous control elements to be controlled independently from each other;
         wherein each of the first continuous control element, the second continuous control element and the third continuous control element are configured to be physically manipulated simultaneously by a hand of an operator of the single-handed seamless camera; and
   an image capture setting controller configured to:
      detect adjustment of at least one of the first, second and third continuous control elements of the single-handed seamless camera,
      retrieve a video function that is mapped to the detected adjustment, with the video function related to a respective image capture setting of the camera;
      map a current value of the adjusted continuous control element to a respective value in a range of values of the video function; and
      apply the mapped value to the video function of the camera to control the respective image capture setting of the camera.

2. The image capture control system according to claim 1, wherein each of the first, second and third continuous control elements of the single-handed seamless camera are configured to linearly adjust the respective first, second and third parameters by rotation of the respective continuous control element around the stick of the single-handed seamless camera.

3. The image capture control system according to claim 1, wherein each of the first, second and third continuous control elements of the single-handed seamless camera are configured to non-linearly adjust the respective first, second and third parameters by rotation of the respective continuous control element around the stick of the single-handed seamless camera to logarithmically or exponentially increase or decrease a respective value of the respective parameter.

4. The image capture control system according to claim 1, wherein the image capture setting controller is configured to preset a reference value for a respective parameter controlled by one of the first, second and third continuous control elements.

5. The image capture control system according to claim 4, wherein the image capture setting controller is configured to determine characteristics of the video content captured by the camera and to identify the preset reference value for the respective parameter based on the determined characteristics.

6. An image capture control system for single-handed seamless camera control of a camera during capture of video content, the image capture control system comprising:
 a single-handed seamless camera controller including:
  a stick extending from a base and configured to operate bi-directionally to adjust a lens iris of the camera;
  a first continuous rotatable control element disposed around the base of the single-handed seamless camera controller and that is configured to rotate about an axis of the stick to control a first parameter of the camera;
  a second continuous control element disposed on the stick of the single-handed seamless camera and configured to control a second parameter of the camera;
  a third continuous control element disposed at a distal end of the stick with the second continuous control element disposed between the first and third continuous control elements, and wherein the third continuous control element is configured to control a third parameter of the camera, and
  wherein each of the first continuous control element, the second continuous control element and the third continuous control element are configured to be physically manipulated simultaneously by a hand of an operator of the single-handed seamless camera; and
 an image capture setting controller configured to:
  detect adjustment of at least one of the first, second and third continuous control elements of the single-handed seamless camera,
  retrieve a video function that is mapped to the detected adjustment, with the video function related to a respective image capture setting of the camera;
  map a current value of the adjusted continuous control element to a respective value in a range of values of the video function; and
  apply the mapped value to the video function of the camera to control the respective image capture setting of the camera.

7. The image capture control system according to claim 6, wherein the single-handed seamless camera controller further includes a dividing element disposed between the second and third continuous control elements and configured to allow the second and third continuous control elements to be controlled independently from each other.

8. The image capture control system according to claim 6, wherein the first parameter is a master gain of the image capture settings of the camera, the second parameter is a color-balance of the image capture settings of the camera, and the third parameter is a master-black value of the image capture settings of the camera.

9. The image capture control system according to claim 6, wherein each of the first, second and third continuous control elements of the single-handed seamless camera are configured to linearly adjust the respective first, second and third parameters by rotation of the respective continuous control element around the stick of the single-handed seamless camera.

10. The image capture control system according to claim 6, wherein each of the first, second and third continuous control elements of the single-handed seamless camera are configured to non-linearly adjust the respective first, second and third parameters by rotation of the respective continuous control element around the stick of the single-handed seamless camera to logarithmically or exponentially increase or decrease a respective value of the respective parameter.

11. The image capture control system according to claim 1, wherein the image capture setting controller is configured to preset a reference value for a respective parameter controlled by one of the first, second and third continuous control elements.

12. The image capture control system according to claim 11, wherein the image capture setting controller is configured to determine characteristics of the video content captured by the camera and to identify the preset reference value for the respective parameter based on the determined characteristics.

13. An image capture control apparatus for single-handed seamless camera control of a camera during capture of video content, the image capture control apparatus comprising:
 a stick extending from a base and configured to operate bi-directionally to adjust at least one setting of the camera;
 a first continuous rotatable control element disposed around the base and that is configured to rotate about an axis of the stick to control a first parameter of the camera;
 a second continuous control element disposed on the stick and configured to control a second parameter of the camera; and
 a third continuous control element disposed at a distal end of the stick with the second continuous control element disposed between the first and third continuous control elements, and wherein the third continuous control element is configured to control a third parameter of the camera,
 wherein each of the first continuous control element, the second continuous control element and the third continuous control element are configured to be physically manipulated simultaneously by a hand of an operator of the single-handed seamless camera.

14. The image capture control apparatus according to claim 13, further comprising an image capture setting controller configured to:

detect adjustment of at least one of the first, second and third continuous control elements of the single-handed seamless camera;

retrieve a video function that is mapped to the detected adjustment, with the video function related to a respective image capture setting of the camera;

map a current value of the adjusted continuous control element to a respective value in a range of values of the video function; and apply the mapped value to the video function of the camera to control the respective image capture setting of the camera.

15. The image capture control apparatus according to claim 13, further comprising a dividing element disposed between the second and third continuous control elements and configured to allow the second and third continuous control elements to be controlled independently from each other.

16. The image capture control apparatus according to claim 13, wherein the first parameter is a master gain of the camera, the second parameter is a color-balance of the camera, and the third parameter is a master-black value of the camera.

17. The image capture control apparatus according to claim 13, wherein each of the first, second and third continuous control elements of the single-handed seamless camera are configured to linearly adjust the respective first, second and third parameters by rotation of the respective continuous control element around the stick of the single-handed seamless camera.

18. The image capture control apparatus according to claim 13, wherein each of the first, second and third continuous control elements of the single-handed seamless camera are configured to non-linearly adjust the respective first, second and third parameters by rotation of the respective continuous control element around the stick of the single-handed seamless camera to logarithmically or exponentially increase or decrease a respective value of the respective parameter.

19. The image capture control apparatus according to claim 14, wherein the image capture setting controller is configured to preset a reference value for a respective parameter controlled by one of the first, second and third continuous control elements.

20. The image capture control apparatus according to claim 19, wherein the image capture setting controller is configured to determine characteristics of the video content captured by the camera and to identify the preset reference value for the respective parameter based on the determined characteristics.

* * * * *